June 29, 1954  N. T. BALDANZA  2,682,234
MOLD FOR HOME FROZEN CONFECTION MANUFACTURE
Filed Jan. 2, 1951
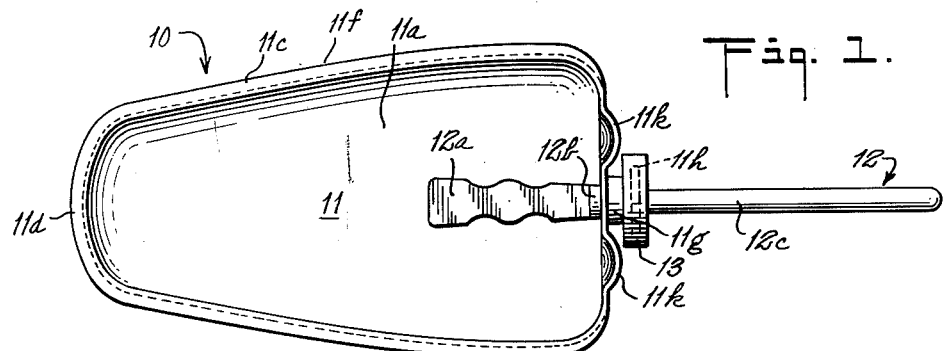
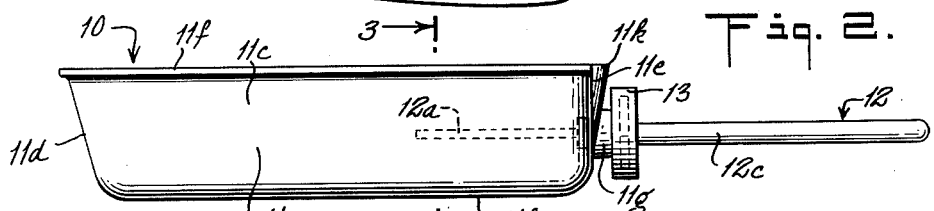
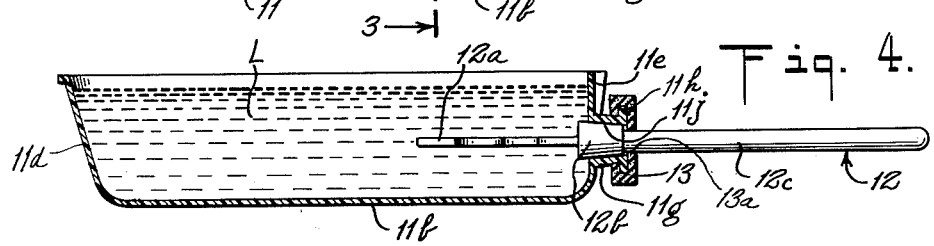
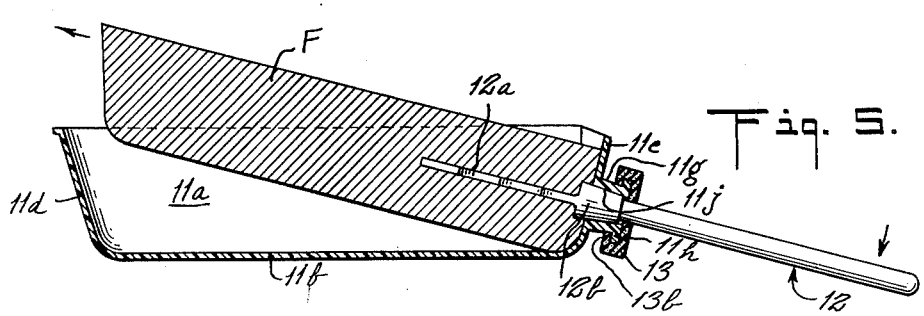
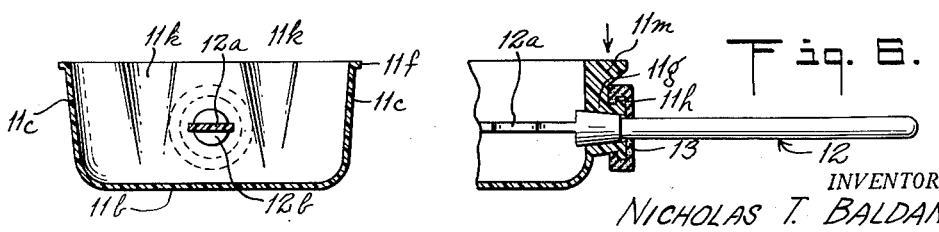
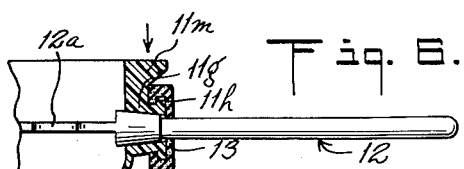
INVENTOR.
NICHOLAS T. BALDANZA
BY
Erwin M. Barnett
HIS ATTORNEY Patented June 29, 1954

2,682,234

UNITED STATES PATENT OFFICE 2,682,234

MOLD FOR HOME FROZEN CONFECTION MANUFACTURE

Nicholas T. Baldanza, Rutherford, N. J., assignor, by mesne assignments, to Curtiss-Wright Corporation, a corporation of Delaware Application January 2, 1951, Serial No. 204,055

6 Claims. (Cl. 107—19)

This invention relates to home frozen confection manufacture, and more particularly is directed to devices for making frozen confections as a home product having stick-handles projecting therefrom in molds of improved construction to permit the removal, expeditiously and requiring a minimum of skill.

Among the objects of the invention is to generally improve devices of the character described which shall comprise few and simple parts that are readily assembled yet rugged in construction, which shall be easily manipulated and requiring a minimum of skill, which devices shall be cheap to manufacture and adapted to be produced in quantity production of molded or cast materials particularly of rubber or resinous plastics, and which shall be efficient and practical to a high degree in use.

Other objects of the invention will in part be obvious and in part hereinafter pointed out.

The invention accordingly consists of features of constructions, combination of elements and arrangement of parts which will be exemplified in the constructions hereinafter disclosed, the scope of the application of which will be indicated in the claims following.

In the accompanying drawing in which embodiments of the invention are shown,

Figs. 1 and 2 are top plan and side elevational views of an empty molding device assembled with a projecting stick-handle constructed to embody the invention ready for making a home frozen confection.

Fig. 3 is a cross sectional view taken on line 3—3 in Fig. 2 showing details of the stick-handle assembly.

Fig. 4 is a sectionalized view in side elevation corresponding to Fig. 2 showing the molding device filled with a fluid confection ready to be frozen in practising the invention.

Fig. 5 is a sectionalized view similar to Fig. 4 but with the confection shown in a frozen state in an outpried position from the molding device during the removal operation thereof, and Fig. 6 is a fragmentary sectional view showing details of a modified tray form and stick-handle assembly embodying the invention.

The invention as here shown and described is particularly adaptable for use as a simplified kitchen utensil in making frozen confections at home and requires ordinary skill and practise in manipulation to produce professional results.

To that end and referring in detail to the drawing, 10 denotes an improved molding device for making frozen confections F constructed to embody the invention. As seen from Figs. 1 to 3 said improved device 10 may comprise a relatively shallow pan or tray 11 of substantially uniform depth having a top side open molding cavity or compartment 11a shaped and sized to suit requirements or of any specific desired configuration, and a stick-handle 12. As here shown said tray 11 may be made of thin sheet material either stamped or molded, preferably being molded of rubber or a suitable resinous plastic in quantity production so as to make the device 10 available as a premium, gift or advertising article of commerce in the well understood manner.

To provide a stable base for device 10, the tray 11 may have a flat bottom side 11b extending under compartment 11a in parallel relation to said open top side thereof, having integrally formed converging wall sides 11c upstanding from said bottom 11b to terminate in a round blunted end wall portion 11d, and an end wall 11e opposite the latter so as to shape the tray 11 to have a cross-sectional shape of modified triangular contour for producing frozen confection F of popular configuration as is clear from Figs. 1 and 5.

Tray wall sides 11c and blunted end wall portion 11d thereof may extend in a down taper from the top side of compartment 11a to bottom 11b to provide drafts along said sides 11c and end wall portion 11d to facilitate the removal of the frozen confection F, and peripheral rim edge 11f of said compartment top open side may be outturned or beaded to serve as a reinforcement therealong. Said rim edge 11f may terminate just beyond the opposite corners formed by the ends of wall sides 11c and end wall 11e to merge with the latter as shown in Fig. 1.

End wall 11e may extend up from bottom 11b and be provided with an integrally formed cylindrically shaped nipple 11g centrally located to extend outwardly therefrom, said nipple 11g being provided at its extreme or free end with a radially outturned flange 11h, and a bore 11j extending centrally through the nipple 11g and through end wall 11e as shown in Figs. 4 and 5. To make the end wall 11e capable of withstanding repeated flexing strains and stresses to which it is subjected during the operation of removal of frozen confection F from tray 11, said end wall 11e may be formed with suitable means, such as outwardly bulged sections or corrugations 11k each extending transversely the length of said end wall 11e spaced from opposite sides of nipple 11g thereby serving to provide a compensating hinge action as is clear from Figs. 4 and 5.

The stick-handle 12 may be made of any suitable rod shaped material, and as here shown may be molded of a relatively rigid plastic having a flattened anchoring end portion 12a which is constructed to be firmly embedded in frozen confection F, a mid-section 12b sized and shaped to be releasably mounted in nipple bore 11j, and a finger gripping end 12c of reduced cross sectional diameter so as to freely pass through said nipple bore 11j.

If desired said stick-handle mid-section 12b may be tapered in the direction of finger gripping end 12c and nipple bore 11j into which said mid-section 12b is removably seated, is tapered correspondingly to provide a sealing joint thereat.

In order to assure the retention of stick-handle 12 in best operative assembly with tray 11 as shown in drawings, to prevent leakage of the confection when in a liquid state and to keep the frozen confection F from accidentally dropping or from sudden detachment when dislodged during prying removal operation thereof from tray 11, said nipple flange 11h may be fitted with a cover cap 13 having a center opening 13a disposed to be positioned in concentric relation to and in alignment with nipple bore 11j through which finger gripping end 12c extends. Said cap 13 may be made of rubber or rubber-like plastic material and said opening 13a thereof sized to frictionally clutch finger gripping end 12c.

To removably anchor cover cap 13 in an effective position, the peripheral rim portion thereof may be formed with an annular inturned flange 13b which snaps in place over nipple flange 11h so that center opening lies in concentric relation to central bore 11j as shown in Figs. 1, 4 and 5.

The utility and operation of the invention will now be apparent. With the tray 11, stick-handle 12 and cover cap 13 manufactured as described above in quantity production and as shown in the drawing, the stick-handle 12 may be assembled in position with tray 11 by inserting finger grip end 12b into the bore 11j from compartment end thereof to seat said mid-section 12b preferably with the flat sides of said anchoring end 12a lying in a plane parallel to tray bottom 11b. Over finger grip end 12c cover cap 13 may next be threaded with said finger grip end 12c extending through cover cap opening 13a, and then inturned flange 13b snap over complementary outturned flange 11h to releasably retain the stick-handle 12 in above described position and as shown in Fig. 3 tray 11 is now ready to receive any well known fluid prepared confection mix L to be frozen or that made up of a suitable recipe.

Device 10 with said fluid confection L in tray 11 filled to a height beyond the level of anchoring end 12a may be placed with the bottom 11a resting on the floor or shelf of a freezing compartment of a home refrigerator or the like in the well understood manner and left until frozen confection F is produced.

To remove the latter from tray 11, device 10 may be allowed to stand for a very short time at room temperature, and an out-prying tilting pressure applied to finger grip handle end 12c, for flexing end wall 11e, as is clear from Fig. 5, the tray 11 being held relatively stationary. Bulged section 11k on opposite sides of nipple 11g provides increased flexibility to facilitate the required degree of bending of end wall 11e for said out-prying operation. The reinforced edge rim 11f on open side of compartment 11a serves as a hand grip means yet leaves said end wall 11e at and between bulge sections 11k free for said flexing action as described above. Frozen confection F may thus be readily lifted out as shown in Fig. 5 and by exerting a gentle push on said finger grip handle end 12c toward compartment 11a, the frozen confection F with the stick-handle 12 having end 12a thereof embedded therein will draw the finger grip end 12c free from nippel bore 11j and cover cap 13 ready for convenient service.

In Fig. 6 details of an improved modified tray construction embodying the invention is shown in which all parts, such as end wall 11e with bulged section 11k, nipple 11g, and stick-handle 12, may be like that described above and shown in Figs. 1 to 5, the additional feature is seen to include a thumb pressure tab 11m which may be provided to extend outwardly from the portion of the rim edge of top opening of compartment 11a extending between bulge sections 11k. Said tab 11m provides a control refinement for applying flexing pressure to end wall 11e in conjunction with or independent of that applied through finger grip end 12c as described above.

It will thus be seen that there is provided improved devices of the character described whereby the several objects of this invention are achieved and which is well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described my invention, I claim as new and desire to secure by Letters Patent:

1. A mold for the freezing of confections comprising a tray formed with a molding cavity having an upstanding end wall extending from a bottom side thereof, a relatively rigid nipple having a central bore outwardly projecting as an integral portion of said end wall, said tray cavity having a top open side, an integral reinforcing rim peripheral edge for the tray open side terminating at spaced apart portions along said upstanding end wall over said nipple, said end wall having spaced apart corrugated sections extending transversely the length thereof with the nipple therebetween to provide a compensating hinge structure for a section of said end wall between said spaced apart portions and nipple for flexibly out-prying a confection when frozen in the tray.

2. A mold for freezing of confections as defined in claim 1, in which a thumb pressure tab is integrally formed to extend from said end wall over said nipple positioned between the terminal ends of said reinforcing rim edge to serve as additional tilting means for outprying said frozen confection.

3. A mold for the freezing of confections comprising a relatively shallow, open-top tray having continuous side walls, with one of said walls being an upright end wall having an outwardly extending nipple integrally connected thereto, and a reinforcing rim edge extending about the top edge portion of said side walls and terminating at spaced apart portions along the length of the said upright end wall, the nipple having a tapered central bore communicating with the interior of the mold and converging toward the exterior thereof for supporting a stick-handle having one end portion located in the tray and the other end portion exterior to the tray, said end wall being corrugated transversely of the length of the upright end wall with said nipple therebetween to provide a compensating hinge structure at the mid-section for flexibly out-prying a confection by exerting a force on the exterior end portion of a stick-handle extending through the bore and having the confection frozen on said other end portion.

4. A mold for the freezing of confections comprising a relatively shallow, open-top tray having continuous side walls, with one of said walls being an upright end wall having an outwardly extending nipple integrally connected thereto, said nipple terminating in a removably mounted flexible joint sealing cover cap, and a reinforcing rim edge extending about the top edge portion of said side walls and terminating at spaced apart portions along the length of the said upright end wall, the nipple and cover cap having central aligned openings communicating with the mold interior and through which a stick-handle may extend with one end portion located in the tray and the other end portion exterior to the tray, said end wall being corrugated transversely of the length of the upright end wall with said nipple therebetween to provide a compensating hinge structure at said mid-section for flexibly out-prying a confection by exerting a force on the exterior end portion of a stick-handle extending through the said bore and having the confection frozen on said other end portion.

5. A mold for the freezing of confections comprising a relatively shallow, open-top tray having continuous side walls, with one of said walls being an upright end wall having an outwardly extending nipple integrally connected thereto, said nipple terminating in a removably mounted flexible joint sealing cover cap, and a reinforcing rim edge extending about the top edge portion of said side walls and terminating at spaced apart portions along the length of the said upright end wall, the nipple having a tapered central bore communicating with the interior of the mold and converging toward the exterior thereof, said cover cap having a central opening aligned with the bore so that a stick-handle may extend through the said nipple bore and cap opening with one end portion located in the tray and the other end portion exterior to the tray, said end wall being corrugated transversely of the length of the upright end wall with said nipple therebetween to provide a compensating hinge structure at the mid-section for flexibly out-prying a confection by exerting a force on the exterior end portion of a stick-handle extending through the nipple bore and cap opening and having the confection frozen on said other end portion.

6. A mold for the freezing of confections comprising a relatively shallow open-top tray having continuous side walls, with one of said walls being an upright end wall having an outwardly extending cylindrically shaped nipple integrally connected thereto, the nipple having a central through-bore communicating with the mold interior, an annular flange outwardly projecting radially to terminate said nipple, and an elastic cover-cap fitted over said flange having an opening disposed in alignment and in concentric relation with said bore.

References Cited in the file of this patent

UNITED STATES PATENTS

| Number | Name | Date |
| --- | --- | --- |
| 1,339,340 | Holland | May 4, 1920 |
| 1,888,739 | Sanders | Nov. 22, 1932 |
| 1,898,658 | Fitterer | Feb. 21, 1933 |
| 2,053,926 | Suiter | Sept. 8, 1936 |
| 2,146,236 | Stamp | Feb. 7, 1939 |
| 2,151,282 | Stamp | Mar. 21, 1939 |
| 2,212,765 | York | Aug. 27, 1940 |
| 2,312,046 | Neilson | Feb. 23, 1943 |
| 2,433,211 | Gits | Dec. 23, 1947 |